Dec. 6, 1966    F. McBROOM ETAL    3,289,955
COIL WINDING APPARATUS
Filed July 29, 1963    2 Sheets-Sheet 1
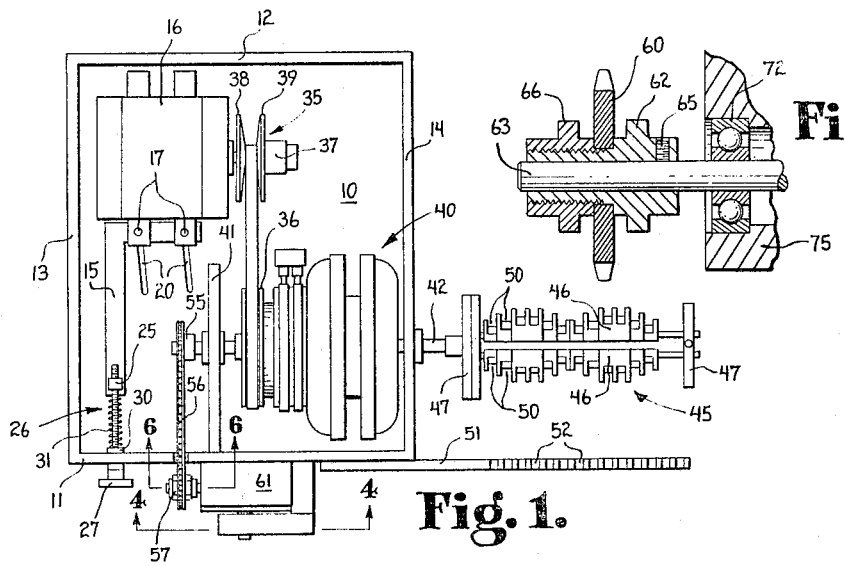
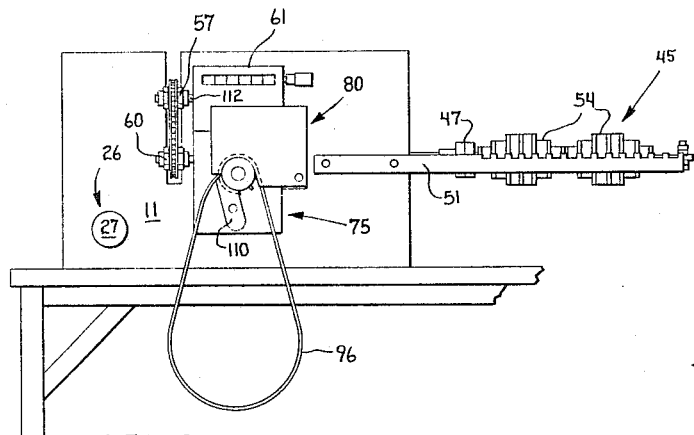
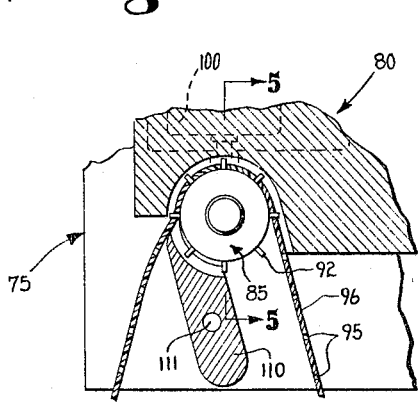
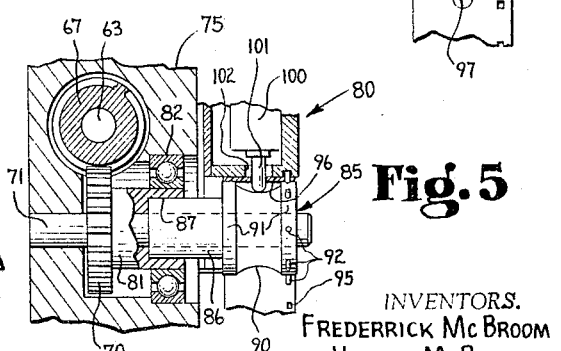
INVENTORS.
FREDERRICK McBROOM
and HILTON McBROOM
BY Lockwood, Woodard, Smith & Weikart
Attorneys Dec. 6, 1966    F. McBROOM ETAL    3,289,955
COIL WINDING APPARATUS
Filed July 29, 1963    2 Sheets-Sheet 2
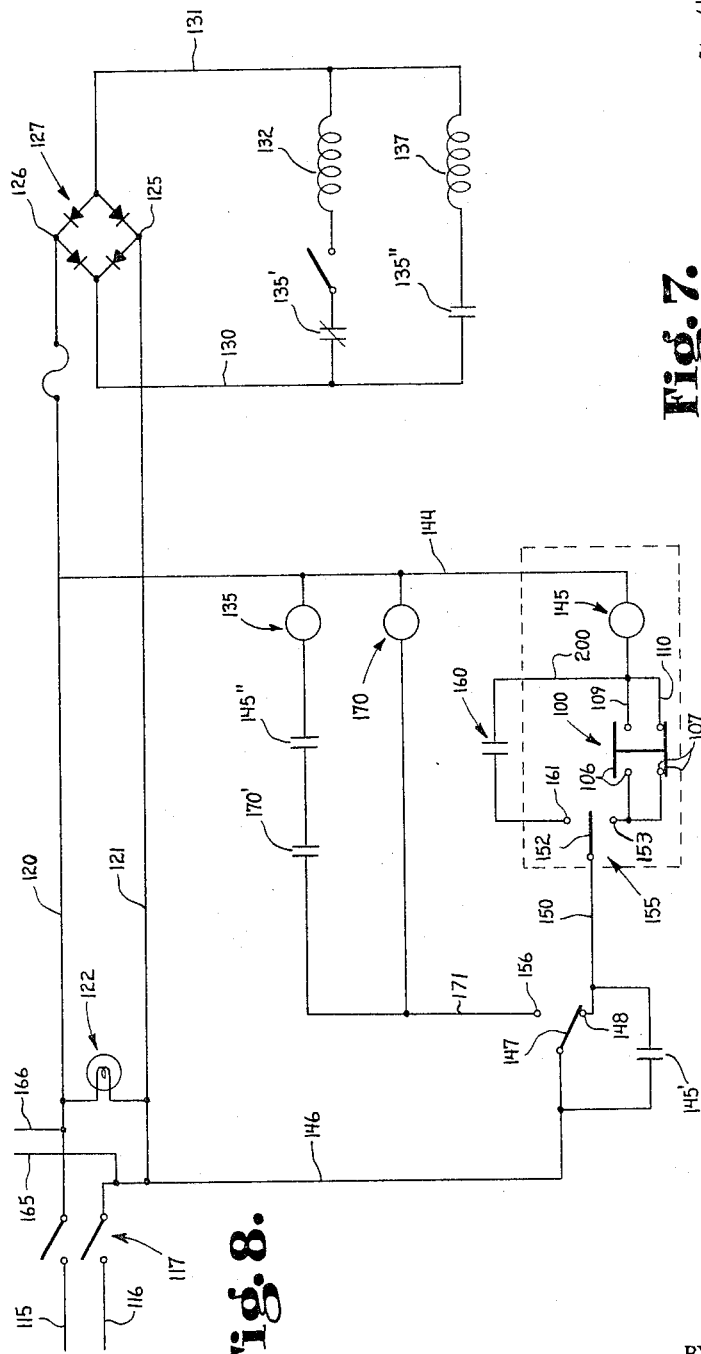
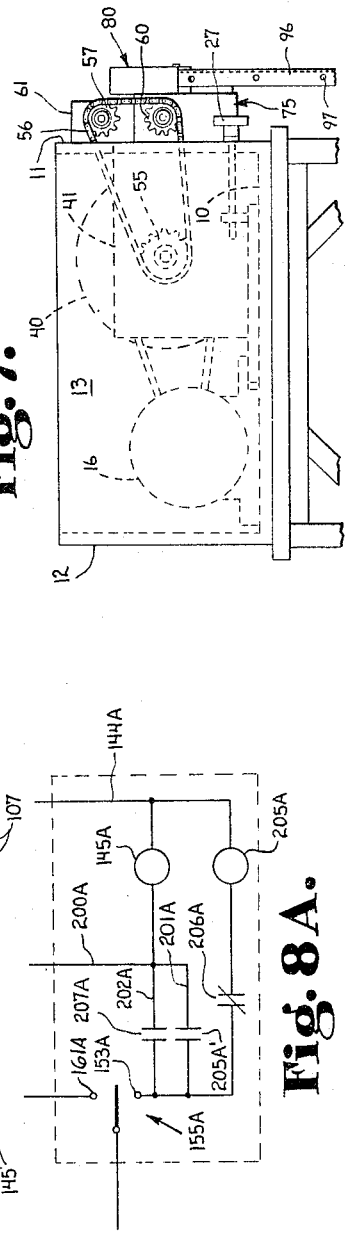
INVENTORS.
FREDERICK McBROOM
and HILTON McBROOM
BY
Lockwood, Woodard, Smith & Weikart
Attorneys United States Patent Office 3,289,955
Patented Dec. 6, 1966

3,289,955
COIL WINDING APPARATUS
Frederrick McBroom and Hilton McBroom, Indianapolis, Ind., assignors to McBroom Electric Co., Inc., Indianapolis, Ind., a corporation of Indiana
Filed July 29, 1963, Ser. No. 298,112
1 Claim. (Cl. 242—9)

The present invention relates to apparatus for coiling wire.

In various applications, it is desirable to wind a plurality of side-by-side coils each of which have a different number of coils therein. For example, coils may be wound in side-by-side relation as replacement coils for the armature of a motor. In medium and small sized shops, it is the present practice to wind such coils by manually actuated coil winding apparatus. Such apparatus might include a spindle mounting a coil form all of which is rotated by a motor energized and deenergized by a foot switch. The number of turns in each coil is determined by reading a counter. There is the problem that the coil can be overwound or underwound by such apparatus so that the operator must slow down the winding operation when he nears the proper number of turns. If a coil is overwound, the operator must back off on the winding until the proper number of turns are in the coil. Consequently, one object of the present invention is to provide improved apparatus for winding a plurality of side-by-side coils in fast accurate manner.

Another object of the present invention is to provide coil winding apparatus which is relatively simple and inexpensive and thus is within the budget of the small sized shop.

Still a further object of the present invention is to provide apparatus for rapidly and accurately winding a plurality of side-by-side coils one or more of which has a different number of turns therein.

Related objects and advantages will become apparent as the description proceeds.

One embodiment of the invention includes coil winding apparatus comprising a frame, a multiple coil winding form rotatably mounted on said frame, a drive motor mounted on said frame, an electromagnetic clutch brake coupled to said winding form, a variable speed pulley arrangement coupling said motor and said electromagnetic clutch brake, a sensing head mounted on said frame and including a rotatably mounted sprocket coupled positively to said winding form for rotation therewith, said positive coupling including a spindle having an abutment fixed thereto, a nut threadedly received on said spindle and locking said sprocket against said abutment, said nut being unthreadable to adjust the position of said sprocket relative to said winding form, a closed loop of tape received on said sprocket and having a first set of apertures at equally spaced intervals meshing with said sprocket teeth, a microswitch having an actuating arm positioned to follow along said tape, said tape having further apertures spaced transversely of said tape and located at predetermined spaced intervals along the length of said tape, a power source for said motor and electromagnetic clutch brake, a circuit controlled by said microswitch and coupling said electromagnetic clutch brake to said motor, said microswitch being arranged to actuate said circuit to open said clutch and operate said brake whenever said actuating arm drops into one of said further apertures, and manually operable means for actuating said circuit to close said clutch and disengage said brake.

The full nature of the invention will be understood from the accompanying drawings and the following description and claim.

FIG. 1 is a top plan view with the cover removed of coil winding apparatus constructed according to the present invention.

FIG. 2 is a front elevation of the structure of FIG. 1 showing the apparatus received upon a table.

FIG. 3 is a plan view of a piece of photographic film or tape used with the present invention.

FIG. 4 is a vertical section taken along the line 4—4 of FIG. 1 in the direction of the arrows.

FIG. 5 is a vertical section taken along the line 5—5 of FIG. 4 in the direction of the arrows.

FIG. 6 is an enlarged vertical section taken along the line 6—6 of FIG. 1 in the direction of the arrows.

FIG. 7 is a side elevation of the structure of FIG. 1.

FIG. 8 is an electrical schematic diagram of the present apparatus.

FIG. 8A is an alternative electrical schematic diagram of the present apparatus.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Referring now more particulaly to the drawings, there is illustrated coil winding apparatus including a base 10, a front wall 11, rear wall 12 and sidewalls 13 and 14. The base 10 has a motor 16 reciprocally mounted thereon. Secured to the motor 16 by a mounting frame 15 are mounting pins 17 which project downwardly into slots 20 which extend at an angle to the sides 13 and 14.

The mounting frame 15 has an upstanding lug 25 fixed thereto. Threadedly received within the lug 25 is a screw 26 having an enlarged head 27. Fixed to the screw by a setscrew and in spaced relation to the head 27 is a collar 30. It can be appreciated that even though the screw 26 is rotated by manual gripping of the head 27, the screw will retain the same axial position as limited by the head 27 and the collar 30.

A coil spring 31 is received upon the screw 26 and acts between the lug 25 and the collar 30. The spring 31 assists the operator in positioning the motor toward the side 12 of the frame. When the motor is moved toward the side 12, the pins 17 ride along the slots 20 so as to maintain the variable speed pulley 35 properly aligned with the pulley 36. The variable speed pulley 35 is conventional in nature and incorporates spring means within the portion 37, said spring means acting to resiliently hold the pulley half 39 toward the pulley 38 which is fixed to the drive shaft of the motor 16. The variable speed pulley 35 may be, for example, Model No. 51 manufactured by The Gerbing Manufacturing Company of Elgin, Illinois.

An electromagnetic clutch brake 40 is mounted upon bearing plate 41 and the side plate 14 by a suitable shaft 42. The bearing plate 41 is fixed to the base and the front 11 of the apparatus. The electromagnetic clutch brake 40 is conventional in nature and may be model No. 308/308, manufactured by Eaton Manufacturing Company of Kenosha, Wisconsin. The electromagnetic clutch brake 40 is chosen for its relatively small inertia of those parts which start and stop upon energization of the clutch and energization of the brake, respectively.

Fixedly mounted upon the shaft 42 is a winding form 45. The winding form 45 is conventional in nature and might be, for example, Model Holden Head, manufactured by H. A. Holden Company, Inc., of Minneapolis, Minnesota. The form 45 incorporates two elements 46 which are identical and are fixed in spaced parallel relationship by the members 47. The elements 46 have a plurality of grooves 50 which are formed with different radii. Each groove 50 in one of the elements 46 corresponds to and is aligned with another such groove in the other element 46. After winding has been completed upon the form 45, the two elements 46 can be moved together to permit removal of the coils from the form.

Fixed to the front of the apparatus is a guide 51 provided with a plurality of grooves 52 each of which is lined up with a respective groove 50 in the winding form 45. The various grooves 52 are used to guide the wire into respective grooves 50 during rotation of the winding form 45 to wind the various side-by-side coils of different radii.

In operating the present apparatus, the operator merely attaches the wire to the winding form 45 within the grooves 50 furthest toward either end of the form. For example, the wire could be started at the most leftward grove 50 as viewed in FIG. 1. The foot pedal of the apparatus is then depressed causing rotation of the winding form. After the proper number of turns have been wound upon the winding form in the leftmost grooves 50, the wire is stepped to the next groove 50.

Because of structure described in detail below, the operator need not withdraw his foot from the foot pedal when winding in the first groove 50 is complete. Instead, the operator merely holds down the pedal and the device automatically stops winding when sufficient turns have been placed within the groove. The operator then places the wire over into the next groove 50 and the next groove 52, withdraws his foot from the foot pedal and redepresses the foot pedal causing the apparatus to again automatically stop when the proper number of turns have been placed in the second most leftward grooves 50.

Because of structure to be described below, the device always stops with the flat portions 54 of the winding form up. Such operation makes possible the operator easily transferring the wire to the next groove 50 for further winding so that the number of turns within each groove is always completely accurate.

The shaft 42 extends completely through the electromagnetic clutch brake 40 and through the bearing plate 41 to a sprocket 55 which is fixed to the shaft 42 and has a chain 56 received thereon in meshing engagement therewith. The chain 56 drives further sprockets 57 and 60. The sprocket 60 is mounted on an abutment element 62 fixed to a shaft 63 by a setscrew 65. The sprocket 60 is fixed in position by a nut 66. The shaft 63 is integral with a worm 67 which drives a worm wheel 70. The shaft 63 rotates within bearings 72 (one shown) mounted within a housing 75. The housing 75 is fixed to the front 11 of the apparatus and has mounted thereon a sensing head 80.

A shaft 71 is fixed to the housing 75 and has a distal end projecting into the sensing head 80. The worm wheel 70 has a sleeve 81 integral therewith, said sleeve and worm wheel rotating about the shaft 71 and within bearings 82 mounted upon the head 75. There is also provided a film sprocket 85 having a sleeve 86 integral therewith and press fitted within the countersink 87 in the sleeve 81. The sprocket 85 has a concave central portion 90 which curves between two outward cylindrical portions 91 from one of which extend teeth 92.

The teeth 92 of the sprocket 85 project through and mesh with apertures 95 along one edge of a piece of film or tape 96. Spaced transversely of the film relative to the apertures 95 and located centrally of the film is a plurality of apertures 97 which are spaced longitudinally of the film at predetermined intervals depending upon the number of turns desired in each of the coils. In one embodiment of the invention, each of the apertures 95 is spaced apart a distance corresponding to one complete revolution of the winding form 45. Thus, the two apertures 97 in FIG. 3 are spaced longitudinally of the film at a proper interval to provide eleven turns in a coil.

Fixedly mounted within the sensing head 80 is a microswitch 100 having an actuating arm 101. The microswitch 100 may be a Micro model BZ–2RW 822, manufactured by the Micro Switch Division of Minneapolis Honeywell Regulator Company, Freeport, Illinois. The actuating arm 101 of the microswitch projects through an aperture 102 in the wall of the sensing head 80 and normally rides against the surface of the film 96. When an aperture 97 of the film moves into alignment with the arm 101, the arm is spring pressed into projected relation through the aperture causing actuation of the microswitch 100 and causing its contacts 106 (FIG. 8) to close and causing its contacts 107 to open. Whenever the microswitch is not projecting through one of the apertures 97 and is engaging the film 96, the microswitch contacts 107 will be closed and the contacts 106 will be open.

A film peeler 110 is pivotally mounted upon the housing 75 about the shaft 111 which is fixed to the housing 75. The film peeler rides along the sprocket as it rotates, between the film and the sprocket separating the film from the sprocket. The film peeler 110 normally engages the portion 91 of the sprocket.

The counter 61 is provided with a sprocket 57 which is substantially identical to the sprocket 60 and which is mounted on the spindle 112 of the counter in identically the same manner as the mounting of the sprocket 60 upon the shaft 63. The purpose of mounting the sprockets 57 and 60 in such a manner that they can be adjusted to a new fixed position is to insure that the winding form 45 always stops with the desired portion thereof facing upwardly and also to insure that the counter 61 reads exactly on a given turn when the form 45 stops. The variable pulley 35 can be adjusted by rotating the head 27 to drive the clutch brake at different speeds which results in the winding form stopping at a different angle of revolution when the brake of the electromagntic clutch brake is actuated.

The arcuate adjustability of the sprocket 60 makes possible resetting of the form with the proper portion thereof up so that that portion always stops in "up" position when the same variable clutch setting is maintained. This is accomplished by releasing the nut 66 of the sprocket 60 and holding the sprocket in the same position as the winding form is rotated to the proper desired position. In like manner, the sprocket 57 can be adjusted so that the counter reads zero or exactly on a number when the brake stops the apparatus.

It will be noted that the tape or film 96 is in the form of a closed loop (FIG. 2). This arrangement causes the cycle of the machine to be repeated again and again. Thus, it is not necessary for the operator to continually restart the tape upon the sensing head and instead the winding form need merely be removed and replaced by a further such winding form in order to repeat the operation.

The electrical circuit of FIG. 8 will be described in connection with a further description of the operation of the device. Referring to FIG. 8, there is illustrated an electrical circuit including power lines 115 and 116 which are controlled by a double pole switch 117. When the switch is closed, the power lines 115 and 116 energize the lines 120 and 121 which lights a pilot light 122 of the device. The closing of the switch 117 also places an alternating current across the points 125 and 126 of a rectifier bridge 127 thus placing a D.C. voltage across the lines 130 and 131. The resulting D.C. current in the lines 130 and 131 passes through the coil 132 of the brake of the electromagnetic clutch brake 40 and through closed contacts 135' of a relay 135. The D.C. voltage across the lines 130 and 131 does not initially energize the coil 137 of the clutch of the electromagnetic clutch brake 40 because of the open contact 135″ of the relay 135.

The relay 145 is initially energized through the lines 121 and 146, the foot switch contact arm 147, foot switch contact 148, the line 150, the contact arm 152 of the selector switch 155, contact 153 thereof, the contacts 107 of the switch 100, contact 107, line 110, through the relay 145 and line 144, thence to the line 120. Energization of the relay 145 causes its normally open contacts 145′ to be closed locking in the relay 145. Thus, the relay 145 is locked in whether or not the contact arm 147 is depressed into contact with the contact 156 and out of contact with the contact 148.

The above mentioned switch 155 can be operated to cause the device to be controlled by the tape 96 and can also be operated to cause the device to be controlled by a microswitch 160 forming a part of the counter 61. When the switch arm 152 of the switch 155 is in engagement with the contact 161, the apparatus will be stopped (that is, the winding of the coil will be stopped) when the electrical contacts of the microswitch 160 are moved out of engagement with one another. Of course, this is a "one-time" arrangement and the device cannot be programmed by use of the counter as it can be by use of tape or film 96.

Assuming again that the switch 155 remains with its contact arm 152 in engagement with the contact 153, the operator secures the end of the wire to be wound to the winding form 45 within the endmost groove 50 and places the wire within the endmost groove 52 in alignment with the selected groove 50.

It will be noted that the motor 16 is operating and is driving the variable speed pulley 35 by reason of fact that the closing of the switch 117 places the voltage across the lines 165 and 166 which provide power to the motor. The operator depresses the foot switch which causes the contact arm 147 to move away from the contact 148 and to engage the contact 156. Because the relay 145 has already been energized, its contacts 145″ are closed. The closing of the contact arm 147 with the contact 156 causes the voltage to be placed across the relay 170 and causes current to flow through the relay energizing the relay, said current flowing through the line 146, contact arm 147, contact 156, line 171, the relay 170 itself and the line 144 to the line 120.

Energization of the relay 170 causes its contacts 170′ to be closed which also causes energization of the relay 135 through the line 146, contact arm 147, contact 156, line 171, contacts 170′, 145″, the relay itself, and the line 144 to the line 120. The energization of the relay 135 causes the relay to open its normally closed contacts 135′ and to close its normally open contacts 135″ which results in a deenergization of the brake coil 132 and an energization of the clutch coil 137. Since the motor 16 is already operating, the deenergization of the brake of the electromagnetic clutch brake and the energization of the clutch of the electromagnetic clutch brake causes the winding form 45 to be rotated and causes a coil to be wound within the first pair of grooves 50 in the winding form.

Such winding continues until the arm 101 of the microswitch 100 drops into one of the apertures 97. As the arm 101 moves into the aperture, the contacts 106 of the microswitch close and the contacts 107 open. Because the circuit of FIG. 8 is intended for speeds over 400 r.p.m., the inertia of the mechanism prevents stopping of the sprocket with the arm 101 projecting through the tape and instead the contacts 106 reopen and 107 reclose. The momentary breaking, however, of the circuit through the relay 135 causes that relay to be deenergized, it being understood that the contact arm 147 is no longer in engagement with the contact 148 to maintain the relay 145 locked in. Thus, when the relay 145 is deenergized, its contacts 145″ open deenergizing the relay 135 and causing its normally closed contacts 135′ to close and causing its normally open contacts 135″ to open.

This procedure energizes the brake of the electromagnetic clutch brake and deenergizes the clutch of said clutch brake causing the winding of the coil in the first groove 50 to be discontinued.

The operator then steps the wire over to the next groove 52 in the winding guide 51 and also places the wire over into the next groove 50 in the winding form 45. He then raises his foot off of the foot switch causing the contact arm 147 to swing into engagement with the contact 148. The disengagement of the contact arm 147 and the contact 156 deenergizes the relay 170 but energizes the relay 145. The relay 145 is energized through the line 146, the contact arm 147, contact 148, the line 150, the switch 155, the contacts 107, the line 110, the relay 145, and the line 144. The operator then redepresses the foot pedal causing the contact arm 147 to move into engagement with the contact 156. In a similar manner to that above described, the relay 145 remains locked in through the contacts 145′. The closing of the contact arm 147 and the contact 156 causes energization of the relays 135 and 170 in a manner similar to that above described.

Assume now that through some accident the winding stops with the arm 101 projecting through the aperture 102. This means that the relay 145 will drop out or be deenergized as above described. However, as the foot switch 147 is depressed and as the device begins to wind the second coil, the sprocket 85 will be rotated causing the film 96 to force the actuating arm 101 to a position causing the contacts 106 to open and the contacts 107 to close. Opening of the contacts 106 will again drop out the relay 145 and in the manner above described, brake the rotation of the winding form 45. In such a situation it is necessary to again release and depress the foot pedal to start the winding.

When the winding speed is below 400 r.p.m., there is the definite possibility that the device will stop with the arm 101 projecting through the aperture 102. Referring to FIG. 8A, an alternative embodiment of the invention is illustrated, said alternative embodiment being identical to the embodiment of FIG. 8 with the exception that the portion enclosed by dotted lines in FIG. 8 is replaced by the circuit illustrated in FIG. 8A. The embodiment of FIG. 8A is intended for use with winding speeds of the winding form 45 less than 400 r.p.m. The switch 155A corresponds to the switch 155 of FIG. 8 while contact 161A, lead 200A and lead 144A correspond to contact 161 and leads 200 and 144.

The relay 145A is connected between the parallel lines 201A and 202A and the line 144A. Relay 145A is provided with a contact identical to contact 145′ and 145″. Connected in series between the contact 153A and line 144A are relay 205A and normally closed microswitch contacts 206A. Connected in series with the lines 201A and 202A, respectively, are contacts 207A and 205A′. The contacts 207A are associated with the microswitch 100 and are open when the arm 101 is projected and closed when the arm is depressed. The contacts 206A are closed when the arm 101 is projected and open when the arm is depressed. Relay 205A controls contacts 205A′, said contacts being closed when the relay is energized and open when the relay is deenergized.

The operation of the alternative embodiment of FIG. 8A is identical to that above described except as follows.

Because of the fact that the device is operating at less than 400 r.p.m. it is likely that rotation will stop with the microswitch arm 101 projecting through one of the apertures 97 in the film 96. When the arm 101 projects into the aperture, the contacts 206A close and the contacts 207A open. The opening of the contacts 207A deenergize the relay 145A which opens the contacts 145″ deenergizing the relay 135 so as to energize the coil 132 of the brake and deenergize the coil 137 of the clutch. Thus, the winding of the apparatus is stopped in exactly the same manner as that above described. The operator then raises his foot off the foot pedal allowing the contact arm 147 to break engagement with the contact 156 and to make engagement with the contact 148. Thus, the relay 170 is deenergized causing the contacts 170' to open. Engagement of the arm 147 with the contact 148 energizes the relay 145A through the switch 155A, the closed contact 205A', the relay 145A and the line 144A, it being understood that the relay 205A is energized through the normally closed contact 206A. The operator then redepresses the foot pedal 147 breaking the contact of the arm 147 with the arm 148 and making contact between the arm 147 and the contact 156. Breaking of the contact of the arm 147 and the contact 148 deenergizes the relay 205A. Even so, the relay 145A is not immediately deenergized because the contacts 205A' are time delay. A suitable relay for this purpose might be a Clark 713 UGD–16 time delay relay with .2 second delay of the contacts 205A'.

Because of the fact that the foot pedal arm 147 is snap actuated by a spring, the breaking of the engagement with the contact 148 is immediately followed by the making of engagement with the contact 156. The clutch coil 137 is, therefore, energized and the brake coil 132 denergized in the above described manner. As the device starts up, the microswitch arm 101 is immediately depressed causing the contact 207A to snap closed and lock in the relay 145A even though the contacts 205A' and 206A open very soon thereafter.

It will be evident from the above description that the present invention provides an improved coil winding apparatus which is relatively simple and inexpensive and thus is within the budget of the small sized shop. It will also be evident that the present invention provides an improved apparatus for winding a plurality of side-by-side coils in a fast accurate manner. It will be further evident that the present invention provides apparatus for rapidly and accurately winding a plurality of side-by-side coils, one or more of which has a definite number of turns therein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

Coil winding apparatus comprising a frame, a multiple coil winding form rotatably mounted on said frame, a drive motor mounted on said frame, an electromagnetic clutch brake coupled to said winding form, a belt and variable speed pulley arrangement coupling said motor and said electromagnetic clutch brake, a sensing head mounted on said frame and including a rotatably mounted sprocket coupled positively to said winding form for rotation therewith, said positive coupling including a spindle having an abutment fixed thereto, a nut threadedly received on said abutment and locking said sprocket against said abutment, said nut being unthreadable to adjust the position of said sprocket relative to said winding form, a film tape sprocket, a closed loop of tape received on said sprocket and having a first set of apertures at equally spaced intervals meshing with the teeth of said sprocket, a microswitch having an actuating arm with a rounded portion positioned to bear against said tape as it moves with said sprocket, said tape having further apertures spaced transversely of said tape relative to said first set of apertures and located at predetermined spaced intervals along the length of said tape, a power source for said motor and electromagnetic clutch brake, a circuit controlled by said microswitch and coupling said electromagnetic clutch brake to said power source, said microswitch being arranged to actuate said circuit to open said clutch and operate said brake whenever said actuating arm drops into one of said further apertures, and manually operable means for actuating said circuit to close said clutch and disengage said brake.

References Cited by the Examiner

UNITED STATES PATENTS

| | | | |
|---|---|---|---|
| 1,268,729 | 6/1918 | Kirkwood | 352—13 |
| 2,085,459 | 6/1937 | Wiget | 139—317 X |
| 2,129,847 | 9/1938 | Knodel. | |
| 2,644,562 | 7/1953 | Pettus | 226—76 X |
| 2,673,471 | 3/1954 | Kline | 74—243 |
| 2,702,016 | 2/1955 | Reece | 192—12.2 X |
| 2,726,818 | 12/1955 | Bailey | 242—7 |
| 2,742,238 | 4/1956 | Clark et al. | 242—9 |
| 2,854,856 | 10/1958 | Oppen | 74—472 |
| 2,927,258 | 3/1960 | Lippel | 318—39 |
| 2,964,252 | 12/1960 | Rosenberg | 242—9 |
| 3,099,924 | 8/1963 | Armstrong | 74—243 |
| 3,166,104 | 1/1965 | Foley et al. | 140—92.2 |

FOREIGN PATENTS 85,748   3/1936   Sweden.

FRANK J. COHEN, *Primary Examiner.*

MERVIN STEIN, STANLEY N. GILREATH,
*Examiners.*

B. S. TAYLOR, *Assistant Examiner.*